United States Patent
Sobran et al.

(10) Patent No.: US 11,379,220 B2
(45) Date of Patent: Jul. 5, 2022

(54) VECTOR EMBEDDING OF RELATIONAL CODE SETS

(71) Applicant: International Business Machines Corporation, Armonk, NY (US)

(72) Inventors: Alexander Sobran, Chapel Hill, NC (US); Bo Zhang, Cary, NC (US); Bradley C. Herrin, Austin, TX (US); Xianjun Zhu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 16/693,524

(22) Filed: Nov. 25, 2019

(65) Prior Publication Data

US 2021/0157577 A1  May 27, 2021

(51) Int. Cl.
| | | |
|---|---|---|
| *G06F 9/44* | (2018.01) | |
| *G06F 8/71* | (2018.01) | |
| *G06F 8/73* | (2018.01) | |
| *G06F 16/17* | (2019.01) | |
| *G06N 3/04* | (2006.01) | |
| *G06F 8/75* | (2018.01) | |
| *G06F 40/157* | (2020.01) | |

(52) U.S. Cl.
CPC .............. *G06F 8/71* (2013.01); *G06F 8/73* (2013.01); *G06F 8/75* (2013.01); *G06F 16/1734* (2019.01); *G06F 40/157* (2020.01); *G06N 3/0454* (2013.01)

(58) Field of Classification Search
CPC ..... G06F 8/71; G06F 8/73; G06F 8/75; G06F 16/1734; G06F 40/157; G06N 3/0454
USPC .................................................. 717/120–122
See application file for complete search history.

(56) References Cited

U.S. PATENT DOCUMENTS

| | | | |
|---|---|---|---|
| 9,542,176 B2 | 1/2017 | Bird | |
| 10,175,979 B1 | 1/2019 | Elwell | |
| 10,534,863 B2* | 1/2020 | Song | ........................ G06N 5/02 |
| 10,628,683 B2* | 4/2020 | Doumbouya | ...... G06K 9/00268 |
| 10,909,459 B2* | 2/2021 | Tsatsin | .................. G06N 3/084 |

(Continued)

OTHER PUBLICATIONS

Wehr et al., "Learning Semantic Vector Representations of Source Code via a Siamese Neural Network", Apr. 2019, Retrieved from https://arxiv.org/abs/1904.11968, pp. 1-6. (Year: 2019).*

(Continued)

*Primary Examiner* — Ted T. Vo
(74) *Attorney, Agent, or Firm* — Randy E. Tejeda

(57) ABSTRACT

In an approach, one or more computer processors create a dictionary for each source code commit in a set of historical source code commits associated with a software deployment; create a similarity model based on the created dictionary for each source code commit in the set of historical source code commits; generate a vector embedding for a source code commit pair based on a set of log differences between source code commit pairs utilizing the created similarity model; generate, responsive to a new source code commit, a new vector embedding based on a set of log differences between the new source code commit and a preceding source code commit utilizing the created similarity model; generate a defect likelihood utilizing the generated new vector embedding; determine, responsive to the generated defect likelihood exceeding a defect likelihood threshold, that the new source code commit contains defects.

19 Claims, 5 Drawing Sheets

(56) References Cited

U.S. PATENT DOCUMENTS

| | | | |
|---|---|---|---|
| 10,949,907 B1* | 3/2021 | Jain | G06K 9/629 |
| 2017/0212829 A1 | 7/2017 | Bales | |
| 2019/0080225 A1* | 3/2019 | Agarwal | G06F 16/35 |

OTHER PUBLICATIONS

Henkel et al., "Code Vectors: Understanding Programs Through Embedded Abstracted Symbolic Traces", 2018, ACM, pp. 163-172. (Year: 2018).*

Fischer et al., "Populating a Release History Database from Version Control and Bug Tracking Systems", International Conference on Software Maintenance, 2003. ICSM 2003. Proceedings, IEEE, 2003, 11 pages.

Huo et al., "Learning Unified Features from Natural and Programming Languages for Locating Buggy Source Code", IJCAI. 2016, 7 pages.

Kim et al., "Where should we fix this bug? a two-phase recommendation model", IEEE Transactions on Software Engineering, vol. 39, No. 11, Nov. 2013, 14 pages.

Queiroz et al., "Towards predicting feature defects in software product lines." Proceedings of the 7th International Workshop on Feature-Oriented Software Development. ACM, 2016, DOI: http://dx.doi.org/10.1145/3001867.3001874, 5 pages.

Ying et al., "Predicting Source Code Changes by Mining Change History", IEEE Transactions on Software Engineering, vol. 30, No. 9, Sep. 2004, 13 pages.

Zhang et al., "Towards Building a Universal Defect Prediction Model", MSR '14, May 31-Jun. 7, 2014, Hyderabad, India, Copyright 2014 ACM 978-1-4503-2863-0/14/05, 10 pages.

* cited by examiner

VECTOR EMBEDDING OF RELATIONAL CODE SETS

BACKGROUND

The present invention relates generally to the field of machine learning, and more particularly to vector embedding of relational code sets.

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Siamese neural networks are artificial neural networks that utilize identical weights while working in tandem on two different input vectors to compute comparable output vectors. Traditionally, one of the output vectors is precomputed, thus forming a baseline against which the other output vector is compared. Siamese neural networks are similar to comparing fingerprints but can be described as a distance function for locality-sensitive hashing. Siamese networks are, frequently, utilized in similarity measures, for example; recognizing handwritten checks, automatic detection of faces in camera images, and matching queries with indexed documents.

SUMMARY

Embodiments of the present invention disclose a computer-implemented method, a computer program product, and a system for determining whether a source code commit is likely to contain defects. The computer-implemented method includes one or more computer processors creating a dictionary for each source code commit in a set of historical source code commits associated with a software deployment, wherein each dictionary comprises a commit level, an associated defect label, and associated logs. The one or more computer processors create a similarity model based on the created dictionary for each source code commit in the set of historical source code commits. The one or more computer processors generate a vector embedding for a source code commit pair based on a set of log differences between source code commit pairs utilizing the created similarity model, wherein the vector embedding is attached with a defect label, wherein the source code commit pair comprises a dictionary and a subsequent dictionary. The one or more computer processors generate, responsive to a new source code commit, a new vector embedding based on a set of log differences between the new source code commit and a preceding source code commit utilizing the created similarity model. The one or more computer processors generate a defect likelihood utilizing the generated new vector embedding. The one or more computer processors determine responsive to the generated defect likelihood exceeding a defect likelihood threshold, that the new source code commit contains defects.

DETAILED DESCRIPTION

Figure 1:
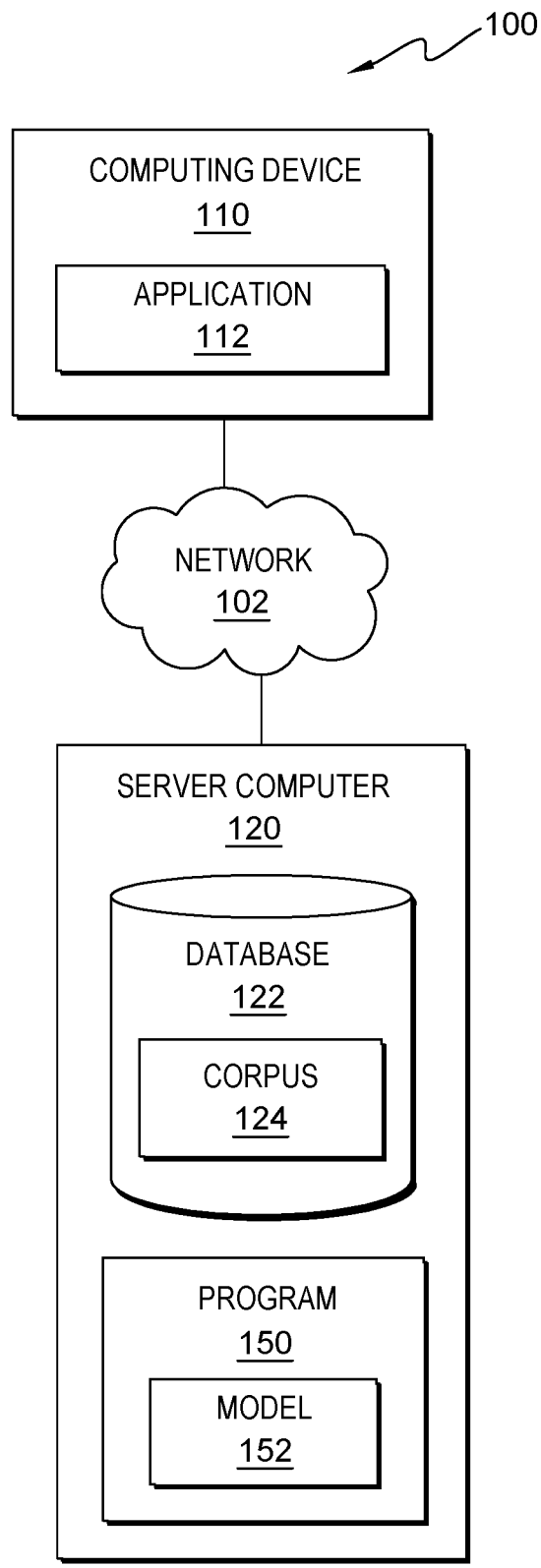
FIG. 1 is a functional block diagram illustrating a computational environment, in accordance with an embodiment of the present invention.

Microservices deployment and related development operations are increasingly becoming a dominant practice in most organizations. Such deployments comprise of many different component systems and services wherein each exist independently but rely heavily on other components. Due to the large amount of isolated, but interconnected components, the capability to detect and fix problems in a new or existing deployment, as quickly as possible, is critical to a successful deployment and a stable production environment. Traditionally, warning systems are implemented to monitor system metrics for unexpected or repeated system warnings and sudden increases in system resource utilization. Traditional warning systems are susceptible to mistakenly mischaracterizing faulty services when problematic software or code prevent the generation of traditional system metrics (e.g., resource metrics, uptime, status updates, etc.).

Some systems may utilize log analysis to detect problematic deployments. Large deployments can generate large amounts of logs, especially when log rates (e.g., polling rates) dictate rapid execution (e.g., seconds and milliseconds intervals). Traditionally, operators aggregate all logs into a log aggregation system and apply manual log analysis techniques, such as regular expression matching, keyword frequency analysis, etc., to identify problematic logs and associated services. This traditional approach has significant issues such as requiring humans to label existing logs as problematic, difficult backtracking, and identification of which commit, log, service, or application is causing the issue or problem, and requiring human intervention to determine which commit is defective and proceed with an appropriate remedial action.

Embodiments of the present invention allow for the identification, determination, and resolution of potentially defective commits. Embodiments of the present invention utilize deep learning models to differentiate between problematic and non-problematic deployments. Embodiments of the present invention identify problematic code commits and associated deployments based on similarity analysis of associated logs and system metrics. In various embodiments, the present invention executes one or more actions based on a defect level or probability. Embodiments of the present invention recognize that system efficiency and effectiveness is improved by creating, training, and utilizing one or more models to identify potential instable and defective commits. Embodiments of the present invention recognize that overall system stability of a plurality of microservices is substantially increased by identifying defective commits before commits are pushed into production environments. Embodiments of the present invention utilize historical deployments, commits, and associated logs to generalize subsequent, potentially unique, deployments, commits, and associated logs. Embodiments of the present invention evaluate the distance between any change between historical log and a current log utilizing similarity analysis techniques. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 5, in accordance with embodiments of the present invention. In the depicted embodiment, computing device 110 contains application 112.

Application 112 is a set of one of more programs designed to carry out the operations for a specific application to assist a user to perform an activity (e.g., word processing programs, spread sheet programs, media players, web browsers). In an embodiment, application 112 is a software application or suite, allowing the aggregation and viewing of commits, associated testing and production logs, and related system and service metrics (e.g., processing utilization, power utilization, memory utilization, etc.). In this embodiment, program 150 may present defect likelihood values or probabilities associated with a specific commit, application, service, or program. In the depicted embodiment, application 112 resides on computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 5.

Database 122 is a repository for data used by program 150. In the depicted embodiment, database 122 resides on server computer 120. In another embodiment, database 122 may reside on computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical commits, associated logs, and associated system metrics. In a further embodiment, database 122 contains information regarding system performance and stability. In the depicted embodiment, database 122 contains corpus 124.

Corpus 124 contains one or more examples, sets of training data, data structures, and/or variables used to fit the parameters of a specified model (e.g., model 152). The contained data may include pairs of input vectors with associated output vectors. In an embodiment, corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets includes "problematic" and "non-problematic" labels paired with associated training statements (e.g., commits, logs, associated applications, etc.). In an embodiment, each training set includes a label and an associated array or set of training statements which is utilized to train one or more models. In an embodiment, corpus 124 contains unprocessed training data. In an alternative embodiment, corpus 124 contains natural language processed (NLP) (e.g., section filtering, sentence splitting, sentence tokenizer, part of speech (POS) tagging, tf-idf, etc.) feature sets. In a further embodiment, corpus 124 contains vectorized (i.e., one-hot encoding, word embedded, dimension reduced, etc.) training sets, associated training statements, and labels. In an embodiment, corpus 124 contains every source code commit associated with one or more software deployments (e.g., sets of historical commits) where each commit comprises a commit level (e.g., timestamped commit, sequential commits, ranked commits, etc.), label (e.g., defect label, similarity score, defect probability, etc.), and associated deployment logs.

Model 152 utilizes deep learning techniques to learn log patterns differentiating problematic deployments from non-problematic deployments. Specifically, model 152 utilizes transferrable neural networks algorithms and models (e.g., long short-term memory (LSTM), deep stacking network (DSN), deep belief network (DBN), convolutional neural networks (CNN), compound hierarchical deep models, saimese neural networks, etc.) that can be trained with supervised and/or unsupervised methods. In the depicted embodiment, model 152 utilizes a saimese neural network (RNN) trained utilizing supervised training methods. In an embodiment, model 152 assesses a commit and associated logs by considering different features, available as structured or unstructured data, and applying relative numerical weights. In various embodiments, the data (e.g., logs, commits, associated applications, etc.) is labeled with an associated classification (e.g., problematic, non-problematic, defect severity value, or defect likelihood, etc.) enabling model 152 to learn what features are correlated to a specific stable or instable commit (e.g., log), prior to use. In various embodiments, the labelled data includes a programming language and associated system requirements of the commit, in addition to an associated log. In an embodiment, the training set includes a plurality of potential features, such as tokenized code segments, functions, variables, objects, data structures, etc. Model 152 learns from a training set of data to distinguish between problematic and non-problematic comments based on a code snippet. In various embodiments, each commit family (e.g., commits related to an application, service, or program) has an associated and specifically trained model. The training of model 152 is depicted and described in further detail with respect to FIG. 2.

Program 150 is a program for determining whether a source code commit is likely to contain defects. In an embodiment, likely to contain defects signifies a considerable probability for a log to contain one or more defects present in a previous log. For example, program 150 may determine that any log with a defect probability or likelihood exceeding 50% is determined to be likely to contain a defect. In various embodiments, program 150 may implement the following steps: create a dictionary for each source code commit in a set of historical source code commits associated with a software deployment, wherein each dictionary comprises a commit level, an associated defect label, and associated logs; create a similarity model based on the created dictionary for each source code commit in the set of historical source code commits; generate a vector embedding for a source code commit pair based on a set of log differences between source code commit pairs utilizing the created similarity model, wherein the vector embedding is attached with a defect label, wherein the source code commit pair comprises a dictionary and a subsequent dictionary; generate, responsive to a new source code commit, a new vector embedding based on a set of log differences between the new source code commit and a preceding source code commit utilizing the created similarity model; generate a defect likelihood utilizing the generated new vector embedding; determine responsive to the generated defect likelihood exceeding a defect likelihood threshold, that the new source code commit contains defects.

In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
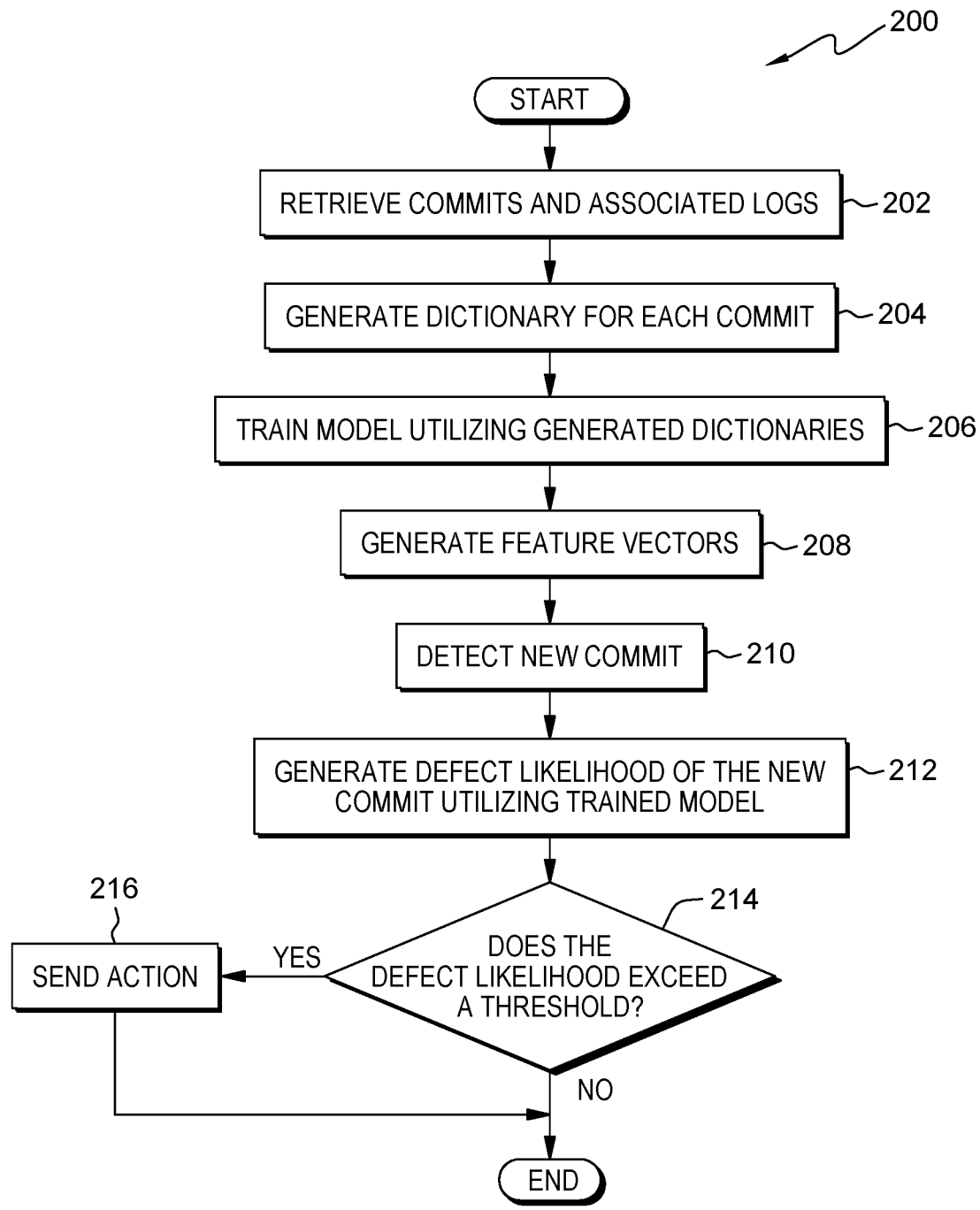
FIG. 2 is a flowchart depicting operational steps of a program, on a server computer within the computational environment of FIG. 1, for determining whether a source code commit is likely to contain defects, in accordance with an embodiment of the present invention.

FIG. 2 is a flowchart depicting operational steps of program 150 for determining whether a source code commit is likely to contain defects, in accordance with an embodiment of the present invention.

Program 150 retrieves each commit and associated logs (step 202). In an embodiment, program 150 initiates when a commit and/or associated log is detected. In another embodiment, program 150 initiates based on a user interaction. For example, the user transmits an initiation notification to program 150 to begin the creation and training of one or more models (e.g., model 152). In an embodiment, program 150 retrieves one or more commits/log and structured training sets from corpus 124. In yet another embodiment, a user inputs one or more commits, logs, or training sets into program 150. In an embodiment, program 150 utilizes NLP techniques to parse and analyze the retrieved logs and associated labels (e.g., problematic, non-problematic, defect likelihood, etc.). In an embodiment, program 150 utilizes section filtering to identify distinct categories, sections, themes, or topics within a commit/log. In a further embodiment, program 150 subdivides each log into distinct contexts (e.g., topic, identified defects or issues). In another embodiment, program 150 utilizes boundary disambiguation (sentence splitting) to delineate the boundaries of an entry within a log. As each log is processed, program 150 may, in parallel, process the context (e.g., programming language, associated labels, related logs, related applications, related projects, development milestones, associated bug reports, etc.) and utilize said context as features for the commit/log training set.

In an embodiment, responsive to the initial processing detailed above, program 150 tokenizes the parsed logs. In this embodiment, program 150 splits every identified log into individual terms/entries and stores the terms in an array or set. In an alternative embodiment, a tokenized section array is constructed into a set, structure, and/or object containing all identified sections and component terms from a given entry, scope, or context. In a further embodiment, program 150 removes punctuation (e.g., commas, periods, etc.) and reduces all letters to lowercase thus reducing the number of required dimensions. In an additional embodiment, program 150 creates a plurality of sets of identified terms and associates these terms with other terms that are in a proximity in the same log or related logs.

Program 150 generates a dictionary for each commit (step 204). In various embodiments, program 150 utilizes syntactic analysis to identify parts of speech and syntactic relations between various portions of the tokenized section or the tokenized sentence. In a further embodiment, program 150 utilizes part-of-speech tagging to identify the part of speech of one or more words in a section based on its relationship with adjacent and related words. For example, program 150 identifies the parts of speech of the words contained in the following example vector ["2019-10-25T21:29:07.623754245+02:00", "error", "processing", "tar", "file", "no", "space", "left", "on", "device"]. In an embodiment, program 150 utilizes term frequency-inverse document frequency (tf-idf) techniques to calculate how important a term is to the vector and/or to the complete log. In an embodiment, program 150 utilizes tf-idf to calculate a series of numerical weights for the terms extracted from a log. In a further embodiment, program 150 utilizes said calculations to identify and weigh frequently used terms. For example, program 150 increases the weight of a term proportionally to the frequency the term appears in the documents and associated rules offset by the frequency of other documents and rules, in corpus 124, that contain the term. In an embodiment, program 150 assigns low tf-idf valued terms a lower weight and high tf-idf valued terms are assigned a higher weight signifying greater importance to the set (e.g., section, vector, log, document, corpus, etc.).

In an embodiment, program 150 vectorizes the processed/partitioned logs and label sets. In this embodiment, program 150 utilizes one-hot encoding techniques to vectorize categorical or string-based (word/term based) feature sets. For example, when vectorizing feature sets of individual words, program 150 creates a one-hot encoded vector comprising a 1×N matrix, where N symbolizes the number of distinguishable terms. In this embodiment, program 150 utilizes one-hot encoding to recode categorical data into a vectorized form. For example, when vectorizing an example term set consisting of [defective, stable, non-problematic], program 150 encodes said corresponding set into the array containing [[1,0,0], [0,1,0], [0,0,1]]. In one embodiment, program 150 utilizes featuring scaling techniques (e.g., rescaling, mean normalization, etc.) to vectorize and normalize numerical feature sets (e.g., defect likelihoods, etc.). In various embodiments, program 150 utilizes word embedding techniques to produce vectors which denote similarities between words that share common contexts. Word embedding techniques create word-based vectors, similar to one-hot encoding, although word embedding creates vectors that are structured so that similar words are positioned in close proximity to each other in the vector space. Another distinction between one-hot encoding and word embedding is that word embedding allows for a vector space dimension to include multiple words while one-hot encoding creates vector spaces with one dimension per word. For example, the sentence "the quick brown fox jumps over the lazy dog" and specifically the word fox can be represented as the vector [0,0,1,1,1,0,0,0], encompassing the word "fox" along with "brown" and "jumps". Word embedding vectors reduce the number of dimensions thus increasing the training speed of the model and reducing system memory requirements. In another embodiment, program 150 utilizes dimension reducing techniques, such as feature extraction, low-dimensional embedding, and kernelling, to reduce the number of dimensions required to represent the training data and features.

Program 150, responsive to the vectorization of a plurality of logs, creates a dictionary (e.g., dictionary object) of common text regions and stop text regions utilizing the generated tf-idf scores, as described above. In this embodiment, one or more dictionary objects are created for each training set, log, or vector. Said dictionary contain processed and vectorized sections of logs that have all unnecessary (e.g., low tf-idf score) terms removed. In an embodiment, all vectors or dictionary objects that do not exceed a tf-idf threshold (e.g., user specific or dynamically adjusted based on all logs in a corpus) are deemed irrelevant or unnecessary and are removed from corpus 124 and program 150. In another embodiment, program 150 removes all dictionary objects that do not pertain to a warning or error. In a further embodiment, program 150 attaches related system performance metrics to each dictionary object in addition to associated labels (e.g., problematic categorization or defect likelihood).

Program 150 creates a model utilizing the generated dictionaries (step 206). In an embodiment, program 150 partitions the tokenized and processed vectors/logs into multiple training and testing sets paired with associated labels. In another embodiment, program 150 partitions logs into discrete sets containing multiple versions of the same log but processed utilizing different NLP techniques. In yet another embodiment, program 150 constructs subsets by identifying the scope of the associated context and segmenting the log or corpus sections into discrete context, topic, subject, issue, or category sets. In various embodiments, program 150 non-deterministically divides the processed sets into training sets and test sets. In an embodiment, program 150 calculates a log difference (e.g., how different and/or how similar) set between consecutive commits based on the generated dictionary objects, as detailed in step 204. In this embodiment, program 150 utilizes Euclidean distance to calculate a difference between consecutive commits, associated logs, and/or related commits. Additionally, program 150 may incorporate the log difference as a feature. For example, program 150 utilizes the following function to train/feed inputs into model 152; (C, P, L, D), where C is a commit, P is the an associated label, L is an associated log, and D is a calculated difference (e.g., log difference, similarity score, etc.).

Program 150 utilizes the partitioned training and testing sets to train model 152. In an embodiment, program 150 initializes model 152 with one or more weights and associated hyperparameters. In an embodiment, program 150 initializes model 152 with randomly generated weights. In an alternative embodiment, program 150 initializes model 152 with weights calculated from the analysis described above (e.g., tf-idf, etc.). In various embodiments, program 150 utilizes weights utilized in historical or previously iterated/trained models. In this embodiment, certain features are weighed higher than others allowing the model to learn at a quicker rate with fewer computational resources. For example, the weights of a previously trained model, that failed to exceed an accuracy threshold, are utilized in a subsequent training iteration. In an embodiment, model 152 is represented as one or more deep learning models such as a simple neural network or a specialized neural network such as a Markov chain, perceptron, recurrent neural network, deep feed forward (DFF), Boltzmann machine, convolutional neural network, etc. In the depicted embodiment, model 152 is a saimese neural network.

Program 150, then, trains model 152 by utilizing a plurality of training methods (e.g., supervised, unsupervised, etc.) based on the constructed feature vectors, as detailed in step 204. In an embodiment, program 150 trains model 152 with a plurality of feature dictionaries (e.g., vectors) originating from the sets extracted from the training data and associated label located in corpus 124. Program 150 determines the appropriate training methods based on the model type of model 152. For example, if the model 152 is a recurrent neural network, then program 150 utilizes a supervised training method. In another embodiment, the user may specify a training method to utilize such as unsupervised training, etc. In the depicted embodiment, program 150 utilizes processed training sets to perform supervised training of model 152. As would be recognized by one skilled in the art, supervised training determines the difference between a prediction and a target (i.e., the error), and back-propagates the difference through the layers such that said model "learns". In an embodiment, program 150 determines whether a sufficient accuracy is obtained by utilizing test sets and the associated test labels. In another embodiment, program 150 utilizes a contrastive loss (e.g., distance-based loss function) as a loss function to determine the level of accuracy of the model. In this embodiment, program 150 compares the predicted sequence with an expected sequence. In yet another embodiment, program 150 utilizes a loss value to calculate error rate, denoting a level of accuracy. In an embodiment, if the calculated accuracy is insufficient, then program 150 continues with supervised training. Alternatively, if the calculated accuracy is determined sufficient, then program 150 ends the training process.

Program 150 generates feature vectors (step 208). Program 150 may generate a feature vector (e.g., vector embedding) for each commit and/or commit pair contained in a repository. In an embodiment, program 150 embeds a set of log differences within a vector embedding. In another embodiment, the program 150 generates a similarity score utilizing trained model 152, as detailed in step 206, based on a set of log differences or based on one or more calculations or comparisons utilizing one or more vector embeddings. In an embodiment, program 150 inputs a plurality of commit pairs into trained model 152 and program 150 utilizes model 152 to generate feature vectors for each commit and generate a similarity score based on the generated feature vectors. In an embodiment, program 150 generates a similarity score by comparing/calculating a similarity between a plurality of generated vector embeddings. Feature vectors contain numerical representations of a processed commit/log. Program 150 utilizes model 152 to determine which features to include in the generated vector representation. In various embodiments, the similarity score is a numerical value or probability denoting a level of similarity between two vector embeddings/feature vectors (e.g., similarity between a set of commits and similarity between associated logs generated from said commits).

Program 150 utilizes related commits and logs to identify problematic commits based on a level of similarity between said related commits and logs. In various embodiments, program 150 creates supersets of all related commits in a repository. In this embodiment, program 150 pairs each commit with every available commit, creating a commit pair (e.g., vector embedding) for every possible commit pairing (e.g., preceding or subsequent). In this embodiment, program 150 includes the generated similarity scores as a label for each commit pair and stores said information into corpus 124. In an embodiment, program 150 utilizes the similarity score of commit pairs (e.g., vector embeddings) with problematic labels to generate a defect likelihood or probability, where the defect likelihood represents the probability that a commit would introduce or retain errors, bugs, defects, or instability associated with a historical commit. In this embodiment, program 150 utilizes a generated similarity score in addition to retrieved historical fixes, corrections, pull requests, and bug reports to generate a defect likelihood value, probability, and/or score. For example, program 150 generates a high similarity score with one or more historical commits containing a plurality of bugs and errors. In this example, program 150 retrieves previous commits and associated fixes and determines whether the associated bugs have been fixed in subsequent commits. Further in this example, program 150 generates a defect likelihood based on the generated similarity score and information regarding historical fixes and associated commits. In this embodiment, program 150 attaches a generated defect likelihood as a feature or label to an individual commit or commit pair. Continuing from the example function described in step 206, program 150 may utilize the following function as an input: $(C_n, P_n, L_n, D_n, V_n)$, where C is a commit, P is the an associated label, L is an associated log, D is a calculated difference, and V is a generated feature vector. For example, program 150 may feed the following commit pair into model 152: [(C$_0$, P$_0$, L$_0$, null, null), ... (C$_n$, P$_n$, L$_n$, D$_n$, V$_n$)].

Program 150 detects a new commit (step 210). Program 150 monitors one or more repositories (e.g., git repo, etc.) or is notified by a plurality of repositories when a user or plurality of users upload, post, or push new code, commits, pull requests, continuous integration images, etc., to the repository. In various embodiments, program 150 acts as an inline proxy and/or a transparent proxy 'sitting' in between a computing device and the destination repository. In this embodiment, all network traffic to and from the computing device and repository will travel through program 150. In another embodiment, program 150 monitors application (e.g., application 112) activity to determine a network request (e.g., code push or modification). In an embodiment, program 150 identifies a push request and pauses, delays, suspends, or halts the push until program 150 generates a defect categorization and/or likelihood, as detailed below in step 212. In various embodiments, program 150 receives a notification, along with associated information and metadata, regarding a new commit. In an embodiment, program 150, automatically, generates defect likelihoods (e.g., probabilities) for all commits contained, referenced, or stored within a repository.

Program 150 generates a defect likelihood of the new commit (step 212). Responsive to program 150 detecting a new commit, program 150 processes a detected commit as described in the steps above. Here, program 150 retrieves associated logs and developmental materials for the detected commit and creates one or more dictionary objects utilizing the aforementioned information. In an embodiment, program 150 removes all unnecessary terms, information, and data, as described in step 204, and vectorizes the resulting commit and associated information. In an embodiment, program 150 creates a dictionary for the new commit. Responsive to program 150 processing and vectorizing the detected commit, program 150 feeds the detected commit into trained model 152. In this embodiment, program 150 determines a log difference, similarity score, and/or defect likelihood for the detected commit utilizing model 152, as described in step 208.

Program 150 calculates one or more similarities and differences between the new commit (e.g., associated logs) and a historical commit (e.g., associated logs). In an embodiment, program 150 pairs the detected commit with the most recent, previously pushed commit. In this embodiment, program 150 feeds model 152 with the processed detected commit and the previously pushed commit to generate vector embeddings and utilize said vector embeddings to calculates a similarity score. In various embodiments, program 150 compares a plurality of historical vectors embeddings with the generated new vector embedding, creating a set of values representing the compared vector embeddings and associated similarity scores. Program 150 utilizes the generated similarity score to calculate a defect likelihood for the detected commit. In another embodiment, program 150 pairs the detected commit with every related commit in a repository, allowing program 150 to identify one or more similar (e.g., high similarity score) commits and calculate one or more defect likelihoods, as described in step 208. In various embodiments, program 150 utilizes a dynamic similarity threshold based on an aggregation of historical processed commits and associated labels. In the situation where multiple commits exceed a similarity threshold, program 150 aggregates all the commits and associated information, generating a composite defect likelihood based on the associated labels of the component commits.

If the defect likelihood exceeds a defect likelihood threshold ("yes" branch, decision block 214), then program 150 sends an action (step 216). Responsive to a detected commit exceeding a defect likelihood threshold, program 150 determines an appropriate response based on the level of severity of a defect and a probability that said defect exists in the detected commit. In an embodiment, program 150 determines a level of defect severity by retrieving and identifying the defect severity in related and similar historical commits with related or similar defects. In an embodiment, program 150 may send a defect notification containing information regarding the defect severity, defect likelihood, affected commits, similar commits, and related solutions. In another embodiment, program 150 converts the defect likelihood into a categorical degree of risk such as "high-risk" or "low-risk" dependent on user defined thresholds or global thresholds. For example, program 150 sends a high-risk warning notification when the user tries to push or retrieve a commit determined risky. In this example, the notification will display a categorical assignment of the defect rather than display a numerical percentage or probability value. In a further embodiment, the notification includes options to ignore the notification and continue with the commit, cancel the transmission of the commit, or pause the process until further user action. In various embodiments, the notification includes an option to deploy the resulting build (e.g., created from the commit) to one or more testing or development environments for further evaluation.

In some embodiments, program 150 may transmit the notification to computing device 110 using a plurality of transmission methods including, but not limited to, graphical user interface (GUI) prompt, short message service (SMS), email, push notification, automated phone call, text-to-speech etc. For example, a user receives a push notification on computing device 110 after attempting to push a commit that exceeded the defect likelihood threshold. In one embodiment, program 150 may utilize text-to-speech methods to provide auditory risk notifications or warnings to the user. In this embodiment, program 150 may utilize NLP techniques to receive and analyze the user response (e.g., send or block the commit). For example, after program 150 transmitted a false positive (i.e., a non-risky commit deemed risky), the user can provide feedback such as an adjusted defect likelihood and/or an error score to model 152. In various embodiments, program 150, automatically, stops, pauses, or reverts a commit that exceeds the defect likelihood threshold.

If the defect likelihood exceeds a defect likelihood threshold ("no" branch, decision block 214), then program 150 terminates. In an embodiment, program 150 returns to step 210 and continues to detect new commits. In an embodiment, program 150 allows the commit to continue through its normal process and deployment procedure.

Figure 3:
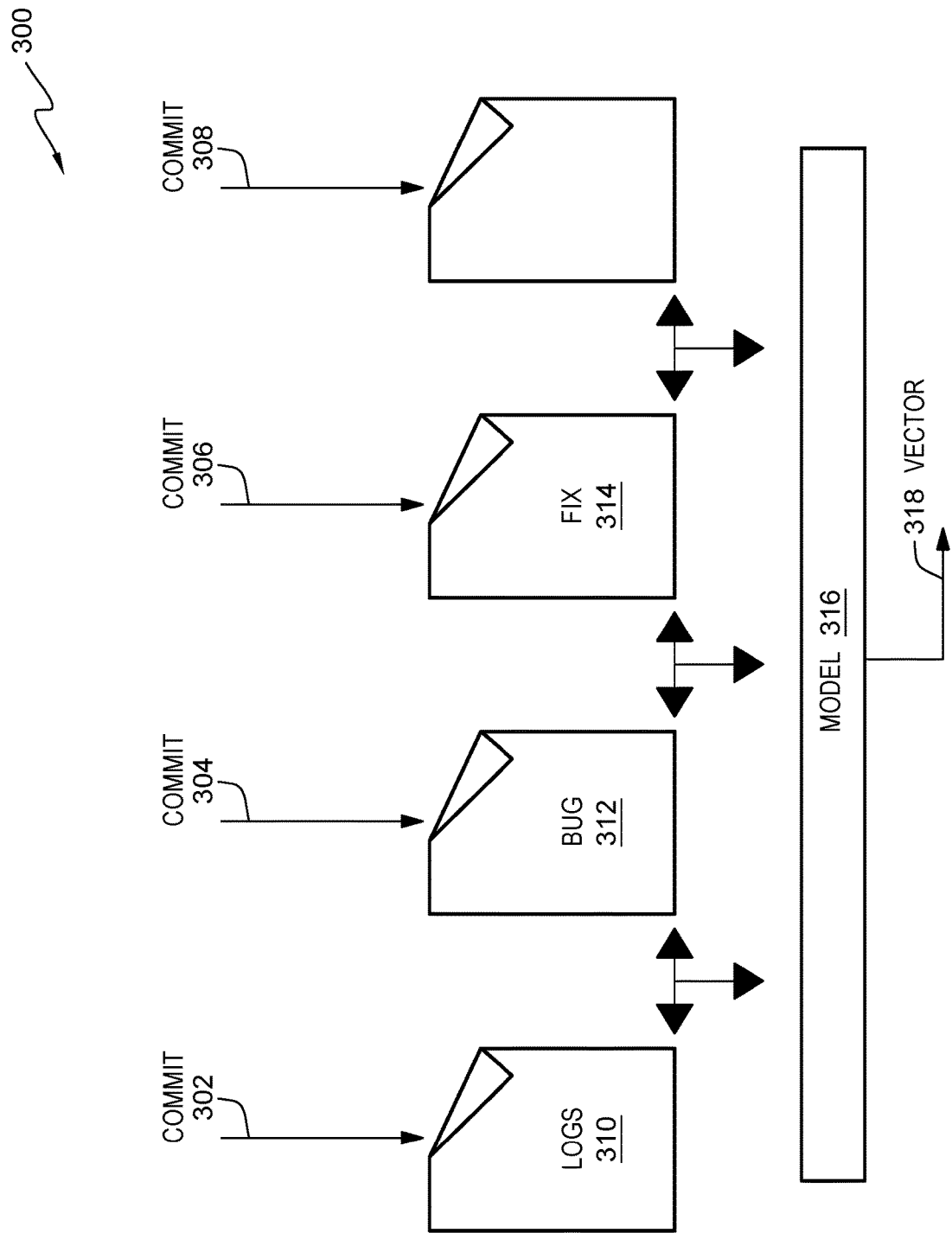
FIG. 3 depicts an example illustrating the operational steps of a program within the computational environment of FIG. 1, in accordance with an embodiment of the present invention.

FIG. 3 depicts example 300, an example illustration of the operational steps of program 150, specifically commit monitoring and vector generation, within the computational environment of FIG. 1, in accordance with an embodiment of the present invention. Example 300 includes commit 302, 304, 306, 308, a plurality of source code commits, logs 310, deployment and production logs associated with a commit, bug 312, an associated log that contains a bug or defect, fix 314, an associated log that contains a fix from bug 312, model 316, a model trained to identify differences between logs, and vector 318, an vector embedding containing one or more sets of log differences.

Figure 4:
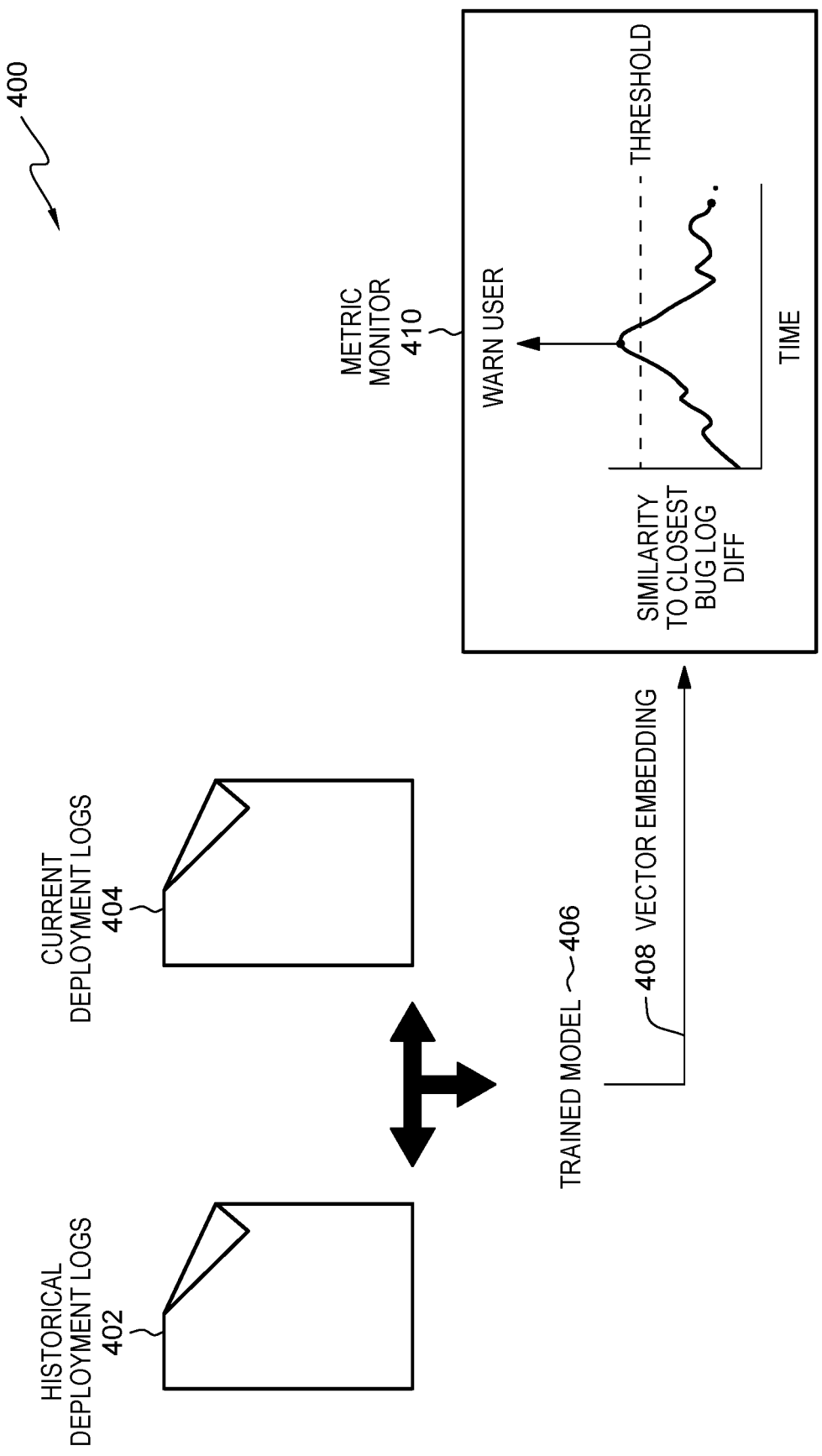
FIG. 4 depicts an example illustrating the operational steps of a program within the computational environment of FIG. 1, in accordance with an embodiment of the present invention.

FIG. 4 depicts example 400, an example illustration of the operational steps of program 150, specifically monitoring log metrics for potential defects, within the computational environment of FIG. 1, in accordance with an embodiment of the present invention. Example 400 includes historical deployment logs 402, one or more logs associated with one or more preceding source code commits, current deployment logs 404, one or more logs associated with a current or most recent source code commit, train model 406, a model trained to identify differences between logs, vector embedding 408, a generated vector containing a set of differences between a pair of logs, and metric monitor 410, an threshold that activates responsive to similar logging.

Figure 5:
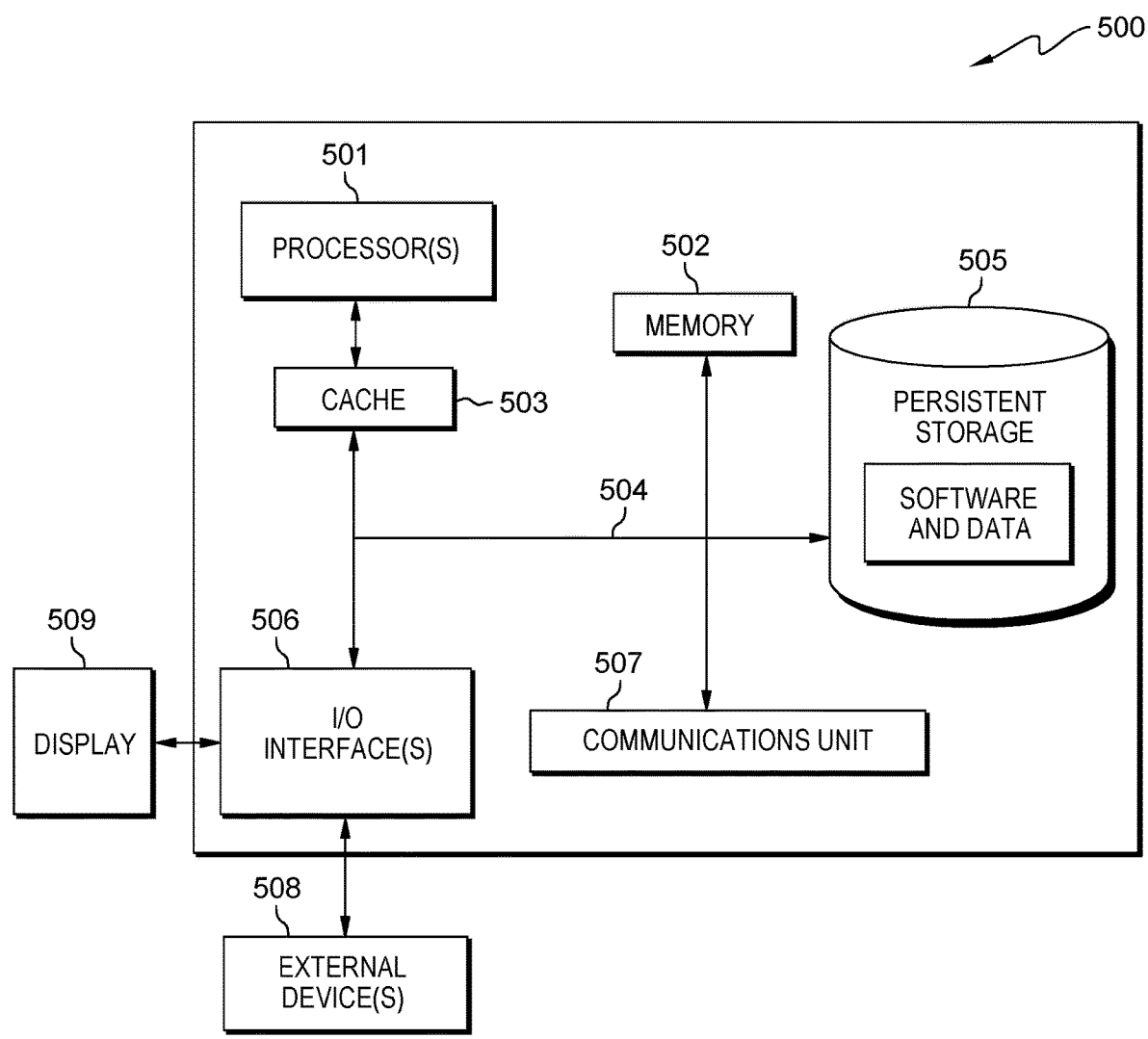
FIG. 5 is a block diagram of components of the computing device and server computer, in accordance with an embodiment of the present invention.

FIG. 5 depicts a block diagram of components of computing device 110 and server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and server computer 120 each include communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Program 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program 150 may be downloaded to persistent storage 505 through communications unit 507.

I/O interface(s) 506 allows for input and output of data with other devices that may be connected to computing device 110 and server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    creating, by one or more computer processors, a dictionary for each source code commit in a set of historical source code commits associated with a software deployment, wherein each dictionary comprises a commit level, an associated defect label, and associated logs;
    generating, by one or more computer processors, a vector embedding for a source code commit pair based on a set of log differences between source code commit pairs, wherein the vector embedding is attached with a defect label, wherein the source code commit pair comprises a dictionary and a subsequent dictionary;
    generating, by one or more computer processors, responsive to a new source code commit, a new vector embedding based on a set of log differences between the new source code commit and a preceding source code commit, comprising:
        suspending, by one or more computer processors, a push of the new source code commit;
        pushing, by one or more computer processors, responsive to the generated defect likelihood, the new source code commit to one or more environments;
    generating, by one or more computer processors, a defect likelihood utilizing the generated new vector embedding; and
    determining, by one or more computer processors, responsive to the generated defect likelihood exceeding a defect likelihood threshold, that the new source code commit contains defects.

2. The method of claim 1, wherein the defect likelihood represents a probability that a subsequent commit retains errors, bugs, and defects associated with the historical source code commit.

3. The method of claim 1, further comprising:
sending, by one or more computer processors, an action based on the generated defect likelihood.

4. The method of claim 3, wherein the action is a defect notification that includes a defect severity, the generated defect likelihood, affected source code commits, and one or more related solutions.

5. The method of claim 1, further comprising:
creating, by one or more computer processors, a similarity model based on the created dictionary for each source code commit in the set of historical source code commits.

6. The method of claim 5, wherein the similarity model is a siamese network.

7. The method of claim 1, wherein generating the defect likelihood utilizing the generated new vector embedding, comprises:
generating, by one or more computer processors, a similarity score based on one or more comparisons between each historical vector embedding in a plurality of historical vector embeddings and the generated new vector embedding, wherein the similarity score is a numerical value denoting a level of similarity between the compared vector embeddings; and
generating, by one or more computer processors, defect likelihood of the detected new commit utilizing generated similarity score, historical fixes, corrections, pull requests, and bug reports, wherein the defect likelihood is a probability that a commit contains defects associated with a historical commit.

8. A computer program product comprising:
one or more computer readable storage media and program instructions stored on the one or more computer readable storage media, the stored program instructions comprising:
program instructions to create a dictionary for each source code commit in a set of historical source code commits associated with a software deployment, wherein each dictionary comprises a commit level, an associated defect label, and associated logs;
program instructions to generate a vector embedding for a source code commit pair based on a set of log differences between source code commit pairs, wherein the vector embedding is attached with a defect label, wherein the source code commit pair comprises a dictionary and a subsequent dictionary;
program instructions to generate, responsive to a new source code commit, a new vector embedding based on a set of log differences between the new source code commit and a preceding source code commit, comprising:
program instructions to suspend a push of the new source code commit;
program instructions to push, responsive to the generated defect likelihood, the new source code commit to one or more environments;
program instructions to generate a defect likelihood utilizing the generated new vector embedding; and
program instructions to determine responsive to the generated defect likelihood exceeding a defect likelihood threshold, that the new source code commit contains defects.

9. The computer program product of claim 8, wherein the defect likelihood represents a probability that a subsequent commit retains errors, bugs, and defects associated with the historical source code commit.

10. The computer program product of claim 8, wherein the program instructions stored on the one or more computer readable storage media comprise:
program instructions to send an action based on the generated defect likelihood.

11. The computer program product of claim 10, wherein the action is a defect notification that includes a defect severity, the generated defect likelihood, affected source code commits, and one or more related solutions.

12. The computer program product of claim 8, wherein the program instructions stored on the one or more computer readable storage media comprise:
program instructions to create a similarity model based on the created dictionary for each source code commit in the set of historical source code commits.

13. The computer program product of claim 12, wherein the the similarity model is a siamese network.

14. A computer system comprising:
one or more computer processors;
one or more computer readable storage media; and
program instructions stored on the computer readable storage media for execution by at least one of the one or more processors, the stored program instructions comprising:
program instructions to create a dictionary for each source code commit in a set of historical source code commits associated with a software deployment, wherein each dictionary comprises a commit level, an associated defect label, and associated logs;
program instructions to generate a vector embedding for a source code commit pair based on a set of log differences between source code commit pairs, wherein the vector embedding is attached with a defect label, wherein the source code commit pair comprises a dictionary and a subsequent dictionary;
program instructions to generate, responsive to a new source code commit, a new vector embedding based on a set of log differences between the new source code commit and a preceding source code commit, comprising:
program instructions to suspend a push of the new source code commit;
program instructions to push, responsive to the generated defect likelihood, the new source code commit to one or more environments;
program instructions to generate a defect likelihood utilizing the generated new vector embedding; and
program instructions to determine responsive to the generated defect likelihood exceeding a defect likelihood threshold, that the new source code commit contains defects.

15. The computer system of claim 14, wherein the defect likelihood represents a probability that a subsequent commit retains errors, bugs, and defects associated with the historical source code commit.

16. The computer system of claim 14, wherein the program instructions stored on the one or more computer readable storage media comprise:
program instructions to send an action based on the generated defect likelihood.

17. The computer system of claim 16, wherein the action is a defect notification that includes a defect severity, the generated defect likelihood, affected source code commits, and one or more related solutions.

18. The computer system of claim 14, wherein the program instructions stored on the one or more computer readable storage media comprise:

program instructions to create a similarity model based on the created dictionary for each source code commit in the set of historical source code commits.

19. The computer system of claim 18, wherein the similarity model is a siamese network.

* * * * *